(12) United States Patent
Whyde

(10) Patent No.: US 6,581,693 B1
(45) Date of Patent: Jun. 24, 2003

(54) HORSESHOE NAIL

(75) Inventor: George J. Whyde, Jamestown, OH (US)

(73) Assignee: Save Edge Nail Worldwide, Inc., Xenia, OH (US)

(*) Notice: Subject to any disclaimer, the term of this patent is extended or adjusted under 35 U.S.C. 154(b) by 70 days.

(21) Appl. No.: 09/694,045

(22) Filed: Oct. 20, 2000

(51) Int. Cl.[7] ................................................ A01L 7/10
(52) U.S. Cl. ...................................................... 168/23
(58) Field of Search ................................ 168/4, 17, 23; 470/35, 36, 37; D8/392, 397

(56) References Cited

U.S. PATENT DOCUMENTS

| | | |
|---|---|---|
| 41,881 A | 3/1864 | Whipple |
| 134,448 A | 12/1872 | Underhill |
| 351,573 A | 10/1886 | Capewell |
| 415,818 A | 11/1889 | Miner |
| 427,030 A | 4/1890 | Kempster |
| 490,393 A | 1/1893 | Miner |
| 490,394 A | 1/1893 | Miner |
| 1,006,585 A | 10/1911 | Moller |
| D228,740 S | 10/1973 | Izumi et al. |
| 5,988,967 A | 11/1999 | Jones ............... 411/489 |

FOREIGN PATENT DOCUMENTS

| | | | |
|---|---|---|---|
| DE | 2961411 | 1/1998 | ......... A01L/7/10 |
| DE | 29802725 | 4/1998 | ......... A01L/7/10 |
| GB | 13219 | of 1889 | |
| GB | 3785 | of 1890 | |

*Primary Examiner*—Peter M Poon
*Assistant Examiner*—Son T. Nguyen
(74) *Attorney, Agent, or Firm*—Stevens & Showalter, LLP

(57) ABSTRACT

A horseshoe nail including a head and a shank having a point, the shank including planar front and rear faces and side walls connecting the front and rear faces at pairs of front and rear corners. The shank further includes an upper shank portion adjacent the head, a lower shank portion at an end of the shank distal from the head, and a middle shank portion between the upper and lower shank portions. The corners of the middle shank portion are rounded to define an arcuate transition between the front and rear faces and the side walls wherein the arcuate transitions provide for a reduction in stresses exerted on a hoof wall when a nail is inserted therein. In addition, the upper shank portion is provided with sharp edges or corners to provide a full width cross section for a portion of the nail in contact with the horseshoe at the junction between the horseshoe and the hoof to provide increased resistance to shearing forces.

8 Claims, 2 Drawing Sheets

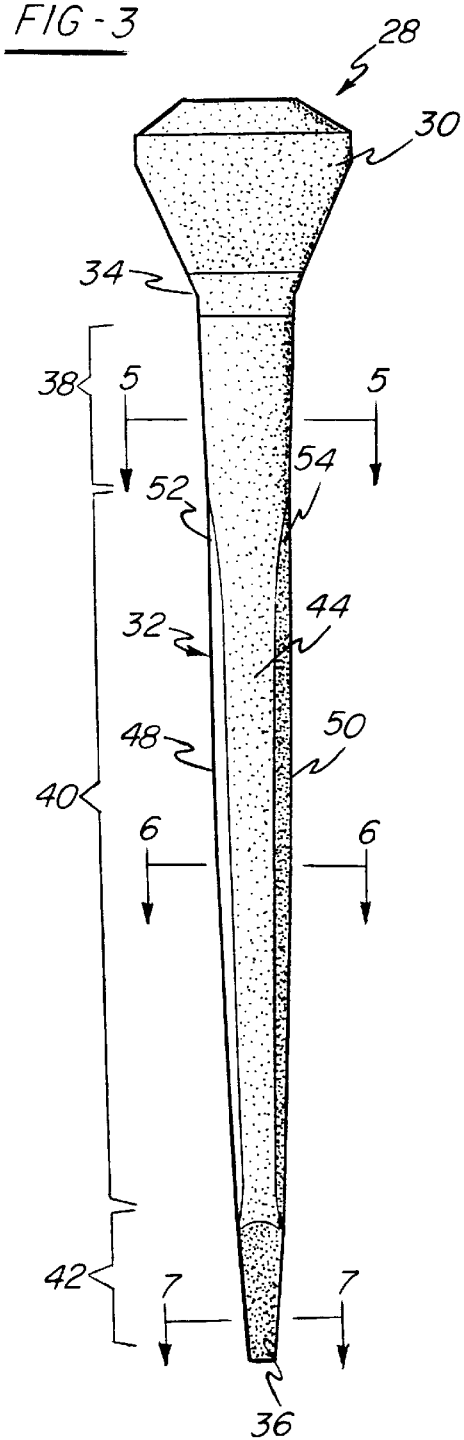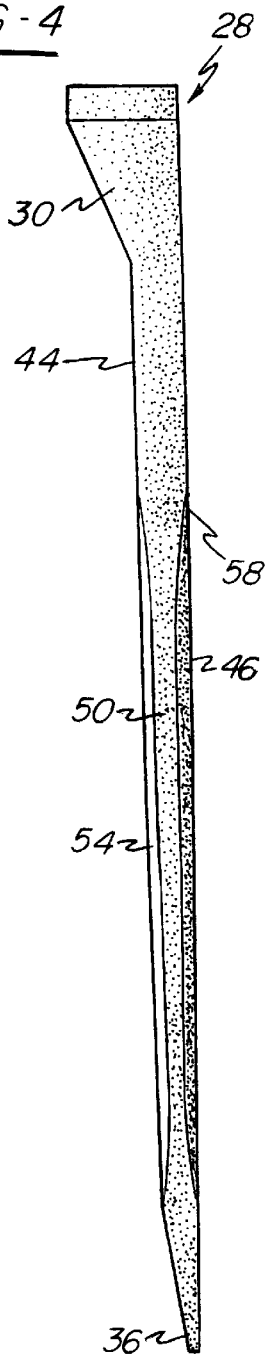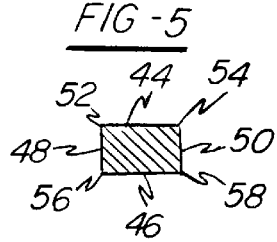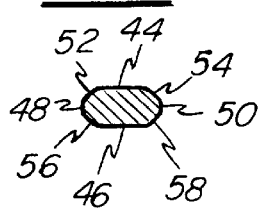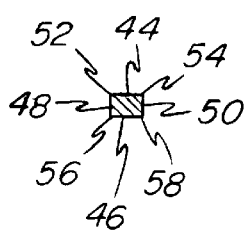

HORSESHOE NAIL

BACKGROUND OF THE INVENTION

1. Field of the Invention

This invention relates generally to horseshoe nails and, more particularly, to a horseshoe nail in which corner portions of the nail are radiused to define arcuate edges to facilitate passage of the nail through a hoof wall and to eliminate stress or pressure points typically associated with conventional nails formed with sharp corners along the length of the nail shank.

2. Description of Related Prior Art

A conventional horseshoe nail is illustrated in FIGS. 1 and 2 of the accompanying drawings and consists of a head 10 and shank 12 terminating in a point 14. Since the head 10 is always within the recess of the horseshoe, its particular configuration does not play a part in this invention and may, for example, be of the "city" type as illustrated, or it may be of the European (E) type, as are conventional and well known to farriers. In the conventional nail, the shank 12 is rectangular or substantially rectangular throughout its length. This shank 12 terminates in a tapered lower portion 16, distal from the head 10, which is tapered at the sides, and ending in a tip 18, which is tapered also on the front face side. The back or rear face is conventionally flat along the length of the shank 12.

The sectional view FIG. 2, which is taken on the line 2—2 of FIG. 1, illustrates a cross section of a midportion of the shank 12 between the point 14 of the shank and the head 10. It will be seen that four discrete, sharp corners are formed at 20, 22, 24 and 26. The pressure on the hoof is inherently concentrated at these corners, and since the shank forms a correspondingly shaped recess in the hoof, the stress in the hoof is similarly concentrated at the location of the recess corresponding to these corners. These stress concentration points or regions often cause unwanted and damaging splitting in the hoof material. This is a particularly troublesome problem in the shoeing of racing horses which require frequent reshoeing, as well as with horses having relatively thin and easily damaged hoof walls.

In addition, the rectangular shape of prior art nails introduces a resistance to bending of the shank of the nail, whereas proper passage of the nail through the hoof requires a certain degree of bending as it passes through the hoof to an outer perimeter exit location on the hoof.

SUMMARY OF THE INVENTION

The stress concentrations caused by the conventional nails are substantially reduced or eliminated by the improved nail of the present invention in which the sharp corners or edges at both the front and rear faces of the nail are radiused to provide an arcuate transition between the front and rear faces and the side walls of the nail along the length of the shank in contact with the hoof wall. The radiused edges at the front and rear faces of the nail provide for a distribution of the wedging and splitting forces across a wider area as the nail is driven through the hoof and, thereafter, in use. Accordingly, the present nail results in reduced damage due to hoof splitting and fractures.

The horseshoe nail, according to the present invention, includes a wider front and rear face than the side walls joining the two faces whereby the nail is preferentially capable of bending in a plane parallel to the side walls. Further, the radiused corners at the front and rear faces result in reduced resistance to bending as the nail is driven through the hoof, such that the present construction facilitates the passage of the nail along the preferred path curving outwardly to exit the site of the hoof wall.

Additionally, the horseshoe nail of the present invention has the further advantage that it can be driven with less friction than the conventional nail and, when the improved horseshoe nail of this invention is removed, the opening which is formed is one which can close up more completely, thereby protecting the hoof from injury or infection due to dirt entering the old nail opening.

The invention may be characterized as a horseshoe nail comprising a head, a shank including front and back faces, terminating in a point, and including side walls connecting the front and back faces wherein the side walls are narrower than the front and back faces. The invention is further characterized in that at least a portion of each of the corners between the front and back faces and adjacent side walls is rounded to define front and rear arcuate transitions between the front and rear faces and the side walls.

The nail of the present invention is additionally characterized by having an upper shank portion adjacent the head and comprising sharp edges or corners, such that the upper shank portion is a full width, rectangular cross section portion. The upper shank portion is adapted to correspond to the portion of the nail extending from the bottom of the hoof and engaged with the side wall of an aperture through the horseshoe whereby the upper portion of the shank provides a full strength section for the horseshoe nail to prevent shearing or other stress induced damage to the horseshoe nail when in use.

Therefore, it is an object of the present invention to provide a horseshoe nail configured to reduce stress to a hoof wall as it passes through the hoof.

It is an additional object of the present invention to provide a horseshoe nail including a shank having at least a portion thereof formed with rounded corners at front and rear faces thereof to provide reduced stress to a hoof wall.

It is an additional object of the invention to provide a horseshoe nail having at least a portion of the shank configured with rounded corners and provided with a full width cross-section in the area which cooperates directly with the horseshoe.

Other objects and advantages of the invention will be apparent from the following description, the accompanying drawings and the appended claims.

BRIEF DESCRIPTION OF THE DRAWINGS

FIG. 3 is an enlarged front plan view of the nail of the present invention;

FIG. 4 is a side view of the nail of FIG. 3;

FIG. 5 is a transverse sectional view of the nail of the present invention taken along line 5—5 in FIG. 3;

FIG. 6 is a transverse sectional view of the nail of the present invention taken along line 6—6 in FIG. 3; and FIG. 7 is a transverse sectional view of the nail of the present invention taken along line 7—7 in FIG. 3.

DETAILED DESCRIPTION OF THE PREFERRED EMBODIMENT

Figure 1:
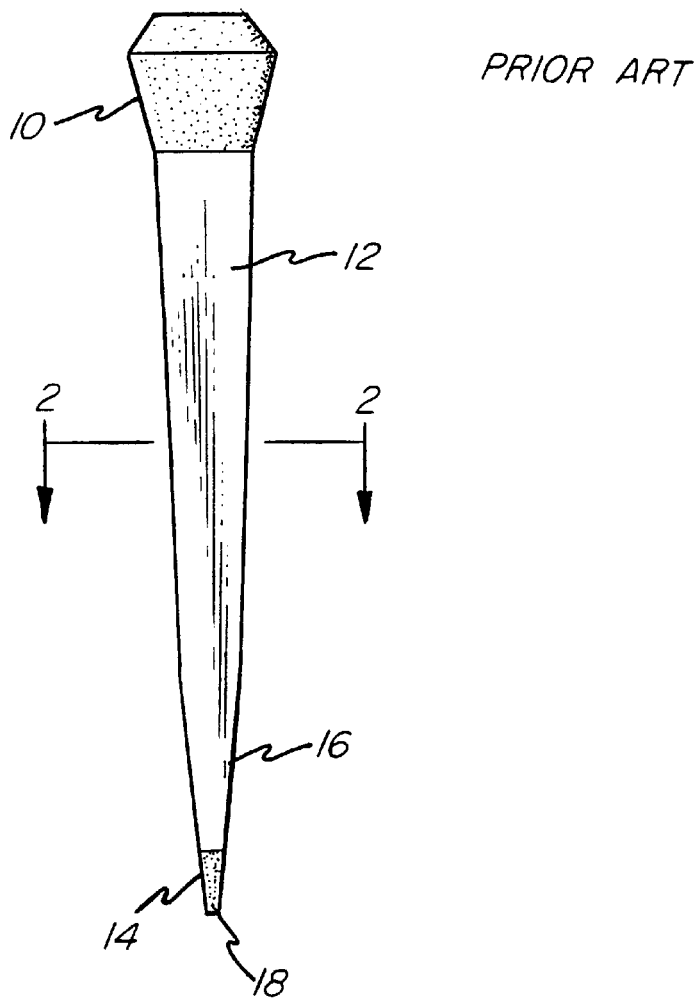
FIG. 1 is a front plan view of a conventional prior art nail.
Figure 2:
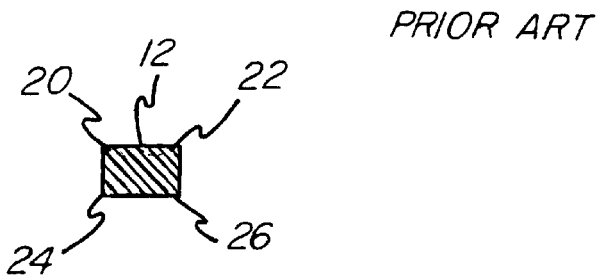
FIG. 2 is a transverse sectional view of the nail in FIG. 1 taken along the line 2—2.

Referring to FIGS. 3–7, the horseshoe nail 28 of the present invention is shown as having a conventional city head 30. Alternatively, the head 30 may be conventionally formed with a European (E) head within the scope of this invention or any variation thereof.

For the purpose of this invention, the nail shank 32 is defined as that portion of the nail extending between the base 34 of the head 30 and a point or tip 36 at a distal location from the head 30.

Further, for the purposes of this invention, the shank 32 will be referenced as having three portions or sections, including an upper shank portion 38, a middle shank portion 40 and a lower shank portion 42. As will be understood further from the discussion below, the middle shank portion 40 is that portion of the shank 32 which is substantially in contact with the hoof wall, the upper shank portion 38 is that portion which is substantially in contact with the walls of an aperture formed in a horseshoe, and the lower shank portion 42 is that portion of the shank 32 which substantially extends outwardly from the side of the hoof wall after the nail 28 is driven through the hoof and the lower shank portion 42 is clinched in a conventional manner to maintain the nail 28 in position within the hoof.

The shank 32 is formed with a substantially planar front face 44 and an opposing substantially planar rear face 46. Narrower side walls 48, 50 connect the front and rear faces 44, 46. A pair of front edges or corners 52, 54 define the intersection or transition between the front face 44 and the side walls 48, 50, and a pair of rear edges or corners 56, 58 (FIG. 6) define the intersection or transition between the rear face 46 and the side walls 48, 50.

From the transverse sectional view of FIG. 6, it can be seen that the edges or corners 52, 54 and 56, 58 are rounded to define front and rear arcuate transitions between the front and rear faces 44, 46 and the side walls 48, 50. The corners 52, 54, 56, 58 defining the arcuate transition between the front and rear faces 44, 46 and the side walls 48, 50 extend along the middle shank portion 40, and are adapted to be positioned in contact within the hoof wall. The rounded corner transitions create an opening in the hoof which has no sharp corners and which thereby reduces the stresses carried by any portion of the hoof wall adjacent to the corners defined by the junctions between the front and rear faces 44, 46 and side walls 48, 50.

Referring to FIGS. 5 and 7, it can be seen that the upper shank portion 38 and lower shank portion 42 are each formed with sharp edges or corners, i.e., 90 degrees corners having a much smaller radius than that of the corners of the middle shank portion 40, such that the upper and lower shank portions 38, 42 are formed with full width cross sections. The full width cross section is particularly important for the upper shank portion 38 which forms approximately 25 percent of the overall length of the shank 32 and is in direct contact with the horseshoe. By providing a full width cross-sectional area for the upper shank portion 38, this portion of the shank 32 is provided with a greater resistance to the shearing forces applied to the portion of the nail extending from the bottom of the horse's hoof.

It should be understand that the shank 32 is formed with a tapered configuration wherein the side walls 48, 50 converge toward each other a first amount from the head 30 to a location adjacent the lower shank portion 42, and the side walls 48, 50 converge toward each other a second amount, greater than the first amount, from a location adjacent the junction between the middle and lower shank portions 40 and 42 to the tip 36 of the shank 32. Further, the front and rear faces 44, 46 converge toward each other in a direction from the head 30, and a front face portion of the lower shank portion 42 converges toward a plane defined by the rear face 46 an increased amount to form a chisel point on the end of the nail 28. The tapered portions of the nail 28 facilitate proper passage of the shank 38 through the hoof wall.

From the above description, it should be apparent that the present invention provides a horseshoe nail which includes a shank configuration, including radiused corners advantageously reducing stress points within the hoof while permitting preferential bending of the shank in a plane extending generally parallel to the side walls to facilitate proper passage of the nail through the hoof. Further, the present nail provides an additional improvement in that, in combination with the radiused corners of the middle shank portion, the upper shank portion is provided with a full rectangular cross section in the area of contact between the horseshoe and the hoof to maximize resistance of the horseshoe nail to shearing forces.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A horseshoe nail comprising a head, a shank having a point, the shank including front and rear faces and side walls connected to the front and rear faces at pairs of front and rear corners wherein the side walls are narrower than the front and rear faces, characterized in that the shank comprises an upper shank portion adjacent the head, a lower shank portion at an end of the shank distal from the head and a middle shank portion between the upper shank portion and the lower shank portion, wherein the corners of the middle shank portion define arcuate transitions from the front and rear faces to the side walls, the transitions extending along the entire length of the middle shank portion, and the front and rear faces comprise planar surfaces along the length of the upper and middle shank portions, the upper shank portion comprising a rectangular cross-section defined by sharply angled corners along the entire length of the upper shank portion whereby a full rectangularly dimensioned area of the nail is provided from the head of the nail to a point of engagement with a hoof to resist shear forces applied perpendicular to the length of the nail.

2. The horseshoe nail of claim 1 wherein the lower shank portion includes sharp corners having a radius which is less than the radius defined by the corners of the middle shank portion.

3. The horseshoe nail of claim 1 wherein the upper shank portion comprises approximately 25 percent of the total length of the shank.

4. The horseshoe nail of claim 1 wherein the side walls are tapered inwardly toward each other in a direction extending from the head.

5. The horseshoe nail of claim 4 wherein the lower shank portion defines a tip of the shank, the side walls tapering toward each other a greater amount at the lower shank portion than along the upper and middle shank portions.

6. The horseshoe nail of claim 5 wherein a portion of the front face on the lower shank portion converges to a plane defined by the rear face.

7. A horseshoe nail comprising:
   an enlarged head portion;
   a shank extending from the head portion and including generally planar front and rear faces, and a pair of side walls connecting the front and rear faces and having a narrower dimension than a width dimension of the front and rear faces;

a front pair of corners connecting the front face to the side walls, and a rear pair of corners connecting the rear face to the side walls;

the shank further including an upper shank portion, a lower shank portion and a middle shank portion located between the upper and lower shank portions wherein the front and rear pairs of corners of the middle shank portion define arcuate transitions from the front and rear faces to the side walls, the transitions extending along the entire length of the middle shank portion, the transitions defining a larger radius than radii defined by the front and rear pairs of corners of the upper and lower shank portions;

the front and rear faces comprising planar faces along the length of the upper and middle shank portions;

the side walls of the shank converging toward each other a first amount along the upper and middle shank portions, and the side walls of the shank converging toward each other a second amount, greater than the first amount, along the lower shank portion;

a portion of the front face on the lower shank portion converging to a plane defined by the rear face; and the upper shank portion comprising a rectangular cross-section defined by sharply angled corners along the entire length of the upper shank portion whereby a full rectangularly dimensioned area of the nail is provided from the head of the nail to a point of engagement with a hoof to resist shear forces applied perpendicular to the length of the nail.

8. The horseshoe nail of claim 7 wherein the upper shank portion comprises approximately 25 percent of the total length of the shank.

* * * * *